United States Patent [19]

Kondo et al.

[11] Patent Number: 5,422,673

[45] Date of Patent: Jun. 6, 1995

[54] VIDEO CAMERA WITH AUTOMATIC FOCUS CONTROL

[75] Inventors: Tetsujiro Kondo; Masashi Uchida, both of Kanagawa; Takeharu Nishikata, Tokyo, all of Japan

[73] Assignee: Sony Corporation, Tokyo, Japan

[21] Appl. No.: 73,008

[22] Filed: Jun. 4, 1993

[30] Foreign Application Priority Data

Jun. 10, 1992 [JP] Japan .................... 4-150972

[51] Int. Cl.$^6$ ........................................... H04N 5/232
[52] U.S. Cl. ...................... 348/352; 348/354
[58] Field of Search ............... 348/349, 352, 354, 234, 348/235, 236, 238, 345, 355, 356; 354/400, 402; H04N 5/232

[56] References Cited

U.S. PATENT DOCUMENTS

| | | | |
|---|---|---|---|
| 4,853,789 | 8/1989 | Murashima et al. | 348/352 |
| 5,210,566 | 5/1993 | Nishida | 348/352 |
| 5,345,264 | 9/1994 | Murata et al. | 348/354 |

Primary Examiner—Michael T. Razavi
Assistant Examiner—Tuan V. Ho
Attorney, Agent, or Firm—Peter C. Toto; Jerry A. Miller

[57] ABSTRACT

A CCD sensor 3 generates video signals in response to an incident light representing an image of an image. In accordance with a video signal supplied from a focusing region of the CCD sensor, a first control section including a focusing control unit 9 generates a focus control signal. In response to the focus control signal, a drive circuit 10 and a motor 1 control an imaging lens 2 so as to focus the lens 2 on the image. Further, in response to a motion vector signal outputted from a motion vector detecting unit 6, a second control section including a distance measurement region control unit 7 controls a position of the focusing region so that the focusing region tracks motion of the image of the object. In addition, a view-finder 11 displays the video signals supplied from the CCD image sensor 3 and a cursor representing the focusing region.

1 Claim, 3 Drawing Sheets

VIDEO CAMERA WITH AUTOMATIC FOCUS CONTROL

BACKGROUND OF THE INVENTION

1. Field of the Invention

This invention relates to a video camera provided with automatic focusing means for detecting whether or not a pictorial image formed on the imaging surface of an imaging section by an image pick-up light irradiated through an image pick-up optical system is in focus to automatically adjust the focusing mechanism of the image pick-up optical system, and more particularly to a video camera having a function to carry out tracking of an object to be image-picked up, i.e., an object to conduct automatic focusing.

2. Description of the Prior Art

Hitherto, in optical cameras or video cameras, in order to securely take a picture or pick up an image in an optimum focused state where those cameras are focused on an object to be image-picked up, i.e., an object, so called an automatic focusing system to allow the object to be image-picked up to be positioned in the distance measurement region at the central portion of a picture to thereby detect whether or not the object image is in focus to automatically adjust the focusing mechanism of the image pick-up optical system has been widely employed. As a technique for detecting whether or not an image of the object is in focus, there have been known a system in which infrared ray or ultrasonic wave is used to measure a distance up to the object, a system for detecting a focused state by making use of the fact that the frequency component included in an image pick-up output is maximum at a focused position as disclosed in the Japanese Patent Application Laid Open No. 1668/1991, and the like.

Further, in recent years, for the purpose of hand movement correction of a picture, such a detection to detect motion vectors from a picture signal has been frequently carried out. Also, a detection of an automatic focusing function of the object tracking system is being frequently carried out such that motion vectors as mentioned above are used to detect motion (movement) of an object to conduct tracking of the object to carry out automatic focusing.

As a method of detecting motion vectors, e.g., a block matching method, etc. is known. In the detection of motion vectors of a frame (picture) by the block matching method, a frame (picture) is divided into a large number of areas (hereinafter referred to as blocks) to calculate absolute values of field differences between representative point pixels of the last field positioned at the central portions of respective blocks and picture data of respective pixels within blocks of the present field to integrate field difference absolute values of respective blocks every corresponding pixels to determine correlative integrated values to form a correlative integrated value table having coordinates corresponding to a pixel arrangement of one block. Thus, a motion vector of the entirety of the frame (picture) is determined with coordinate values of the minimum value of the correlative integrated values in the correlative integrated value table being as coordinate values of the motion vector of the frame (picture).

Meanwhile, in the case where automatic focusing of the object tracking system is carried out, when it is assumed that an image of an object O to be picked up is present at the central portion of a picture at time t as shown in FIG. 1, for example, since the distance measurement area $AR_{DF}$ of the automatic focusing mechanism is generally present at the central portion of the picture, the camera is focused on the object O to be image-picked up in this scene, resulting in a reasonable focused state. However, when it is assumed that the image of the object O to be picked up is moved in a right direction of the picture as shown in FIG. 2 at the subsequent time t+1, the image of the object O to be picked up is almost off from the distance measurement area $AR_{DF}$. Accordingly, the camera is not focused on the object O to be image-picked up, so it might be instead focused on the background.

It is to be noted that although the detection range for detecting whether or not an image of an object to be picked up is in focus can be widened by broadening the distance measurement area $AR_{DF}$, high detection accuracy cannot be ensured by such a method. As a result, it is extremely difficult to obtain a reasonable focused state.

OBJECT AND SUMMARY OF THE INVENTION

In view of actual circumstances of the prior art as described above, an object of this invention is to provide a video camera having an automatic focusing function of the object tracking system, which can pick up an image of an object easily and securely in an optimum focused state.

To achieve the above-mentioned object, in accordance with this invention, there is provided a video camera for outputting a video signal, comprising: image pick-up means for generating the video signal in response to an incident light representing an image; lens means for guiding the incident light to the image pick-up means; first control means for generating a focus control signal in accordance with a video signal supplied from a focusing region of the image pick-up means; focusing means for controlling the lens means in accordance with the focus control signal so as to focus the lens means on the image; detecting means for detecting motion of the image to output a motion vector signal representing the motion; and second control means for controlling a position of the focusing region in accordance with the motion vector signal so that the focusing region tracks motion of the image.

The video camera may further comprise display means for displaying the video signal supplied from the image pick-up means and a cursor representing the focusing region.

The above-mentioned image pick-up means may preferably comprise a CCD (Charge Coupled Device) image sensor.

In addition, the display means may have a viewfinder.

In operation, the image pick-up means generates a video signal in response to an incident light representing an image. At this time, the lens means (optical system means) guides the incident light to the image pick-up means. The first control means generates a focus control signal in accordance with a video signal supplied from a focusing region of the image pick-up means. In response to the focus control signal, the focusing means controls the lens means so as to focus the lens means on the image. Further, in response to a motion vector signal from the motion detecting means, the second control means controls a position of the focusing region so that the focusing region tracks motion of the image.

DETAILED DESCRIPTION OF THE PREFERRED EMBODIMENT

A preferred embodiment of a video camera according to this invention will now be described in detail with reference to the attached drawings.

Figure 3:
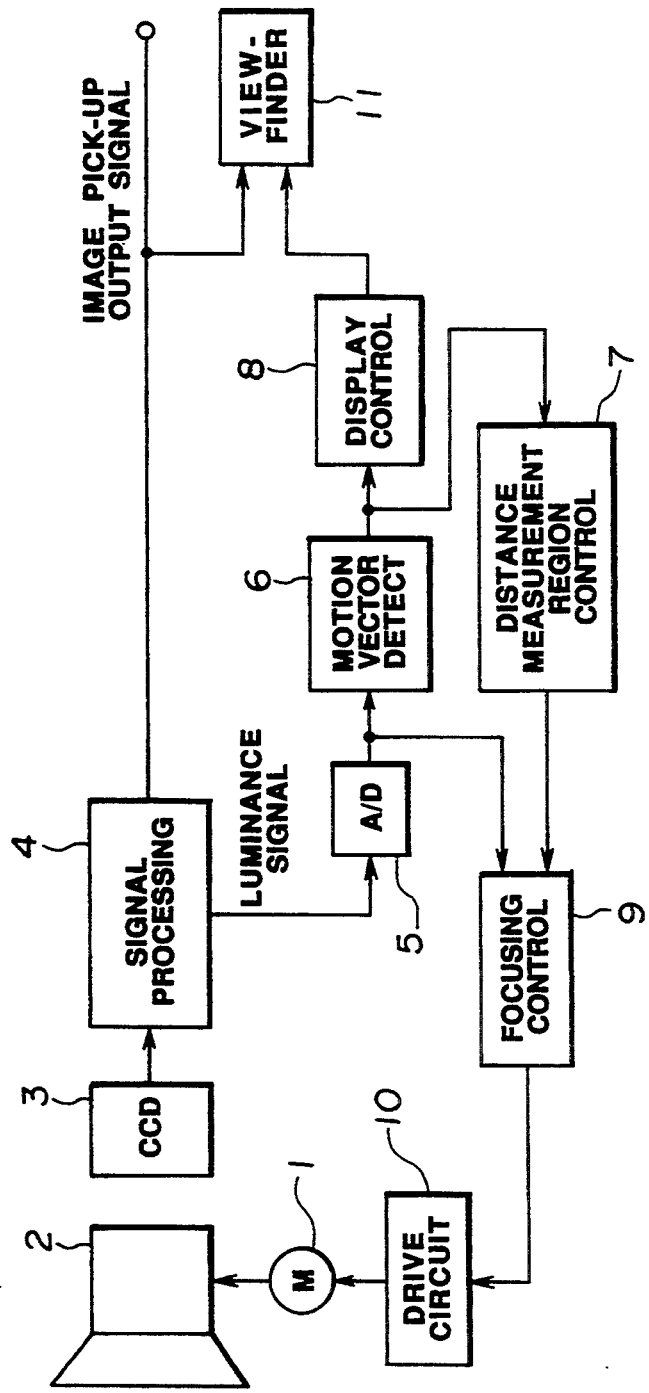
FIG. 3 is a block diagram showing the configuration of a video camera of an embodiment according to this invention.

A video camera according to this invention is constituted as shown in FIG. 3, for example.

The video camera shown in FIG. 3 essentially comprises: image pick-up means (including a CCD image sensor 3, etc.) for generating a video signal in response to an incident light representing an image; lens means (including an imaging lens 2, etc.) for guiding the incident light to the image pick-up means; first control means (including a focusing control unit 9, etc.) for generating a focus control signal in accordance with a video signal supplied from a focusing region of the image pick-up means; focusing means (including a drive circuit 10 and a motor 1, etc.) for controlling the lens means in accordance with the focus control signal so as to focus the lens means on the image; detecting means (including a motion vector detecting unit 6, etc.) for detecting motion of the image to output a motion vector signal representing the motion; and second control means (including a distance measurement region control unit 7, etc.) for controlling a position of the focusing region in accordance with the motion vector signal so that the focusing region tracks motion of the image.

More particularly, an image pick-up light is irradiated to the CCD image sensor 3 through the imaging lens 2 having a focusing mechanism driven by the motor 1 to output an image pick-up output signal obtained by the CCD image sensor 3 through a signal processing circuit 4. This video camera further comprises an A/D converter 5 supplied with a luminance signal from the signal processing circuit 4, the motion vector detecting unit 6 supplied with a luminance signal in a digital form from the A/D converter 5, the distance measurement region control unit 7 and a display control unit 8 which are supplied with a motion vector detected by the motion vector detecting unit 6, and the focusing control unit 9 supplied with a luminance signal in a digital form from the A/D converter and supplied with a distance measurement region control signal from the distance measurement region control unit 7. Thus, the focusing control unit 9 controls the drive circuit 10 for the motor 1 to carry out an automatic focusing control. In addition, the display control unit 8 effects a control to display a distance measurement region of the focusing control unit 9 on the display screen of a view-finder 11. In the video camera of this embodiment, the imaging lens 2 constitutes an image pick-up optical system for forming an object image by an image pick-up light on the imaging surface of the CCD image sensor 3, i.e., or the image pick-up unit. This imaging lens 2 is automatically controlled so that it is placed in a focused state as the result of the fact that the drive circuit 10 for the motor 1 which drives the focusing mechanism is controlled by the focusing control unit 9.

The CCD image sensor 3 adapted so that an image pick-up light is irradiated onto the imaging surface through the imaging lens 2 picks up an object image formed by the image pick-up light to convert it to an electric image pick-up output signal to deliver that image pick-up output signal to the signal processing circuit 4.

The signal processing circuit 4 implements process processing or encode processing, etc. to the image pick-up output signal from the CCD image sensor 3 to form a luminance signal and color video signals in conformity with a predetermined standard television system. Then, the signal processing circuit 4 delivers the luminance signal to the A/D converter 5, and delivers the color video signals to the view-finder 11 and outputs them from the signal output terminal.

The A/D converter 5 digitizes the luminance signal delivered from the signal processing circuit 4 to deliver corresponding digital signals to the motion vector detecting unit 6 and the focusing control unit 9.

The motion vector detecting unit 6 detects motion vectors of a picture every respective regions (macro blocks) obtained by dividing a frame into a plurality of segments by the block matching method, for example, to separate motion vectors of a background picture by hand movement and motion vectors resulting from motion (movement) of an object from motion vectors of respective macro blocks, thus to detect motion vectors resulting from motion (movement) of the object in a distance measurement region which will be described later. Then, the motion vector detecting unit 6 delivers the detected motion vectors to the distance measurement region control unit 7 and the display control unit 8.

The distance measurement region control unit 7 generates a distance measurement control signal in correspondence with a motion vector representing motion of the object detected by the motion vector detecting unit 6 to carry out a control to move the distance measurement region of the focusing control unit 9 by the distance measurement region control signal. Namely, the distance measurement region control unit 7 controls a position of the focusing region of the CCD image sensor 3 in accordance with a motion vector signal so that the focusing region tracks motion of the object image.

The focusing control unit 9 extracts frequency components within the distance measurement region with respect to the luminance signal digitized by the A/D converter 5 to thereby detect whether or not an image formed on the imaging surface of the CCD image sensor 3 is in focus to control the drive circuit 10 for the motor 1 so that there results an optimum focused state, thus to carry out an automatic focusing control. In this focusing control unit 9, the distance measurement region is controlled by a distance measurement region control signal from the distance measurement region control unit 7, so the distance measurement region is moved in dependency upon a motion vector representing motion of an object detected by the motion vector detecting unit 6. Accordingly, it is possible to carry out an automatic focusing control so as to conduct tracking of motion of an object to be image-picked up, i.e., an object so that the lens is always in an optimum focused state with respect to the object.

Figure 4:
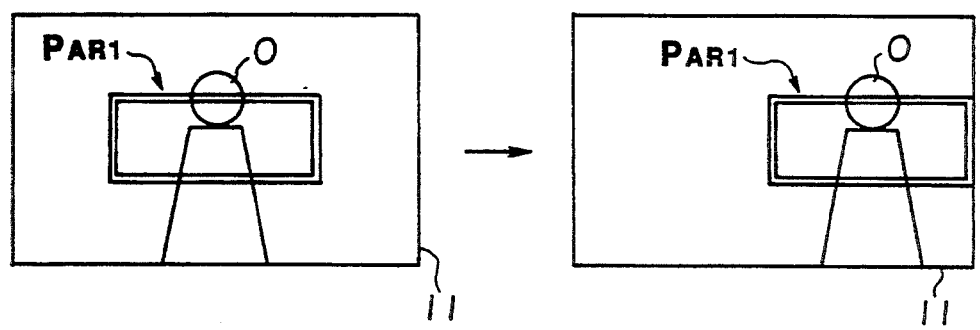
FIG. 4 is a view showing a display example of a picture displayed on the display screen of the view-finder of the video camera.

The display control unit 8 carries out a display control to display, on the display screen of the view-finder 11, a position of the distance measurement region of the focusing control unit 9 in dependency upon a motion vector of an object detected by the motion vector detecting unit 6. Thus, on the display screen of the view-finder 11, the position of the distance measurement region of the focusing control unit 9 moved so to track motion of the object is displayed along with an object O to be image-picked up as a display pattern $P_{AR1}$ in a frame form (cursor) corresponding to the distance measurements region in such a manner that it is superimposed on a picture indicated by color video signals outputted from the signal processing circuit 4 as shown in FIG. 4, for example.

Figure 5:
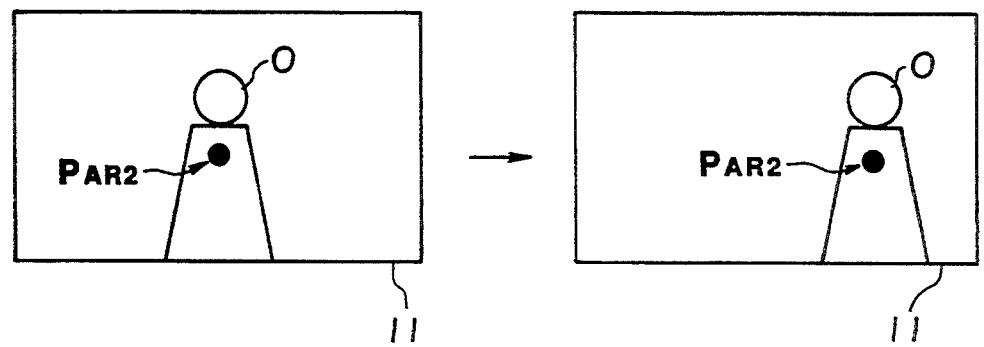
FIG. 5 is a view showing another display example of a picture displayed on the display screen of the view-finder of the video camera.

It is to be noted that the central position of the distance measurement region of the focusing control unit 9 may be displayed, e.g., as a display pattern $P_{AR2}$ in a form of ● on the display screen of the view-finder 11 as shown in FIG. 5, for example.

Figure 1:
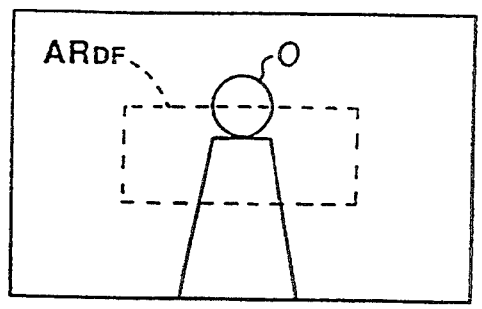
FIG. 1 is a view showing a normal positional relationship between an object to be image-picked up and a distance measurement region in the automatic focusing control of the object tracking system.
Figure 2:
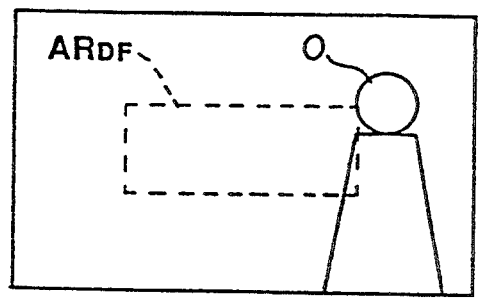
FIG. 2 is a view showing the state where the object to be image-picked up and the distance measurement region are positionally shifted in the automatic focusing control of the object tracking system.
Figure 6:
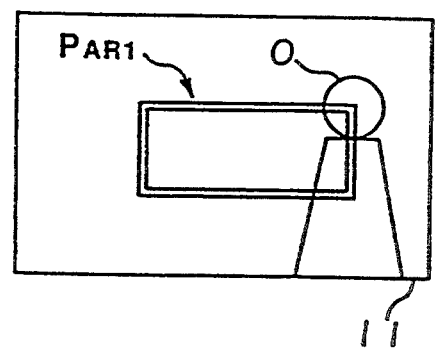
FIG. 6 is a view showing a further display example of a picture displayed on the display screen of the view-finder of the video camera.
Figure 7:
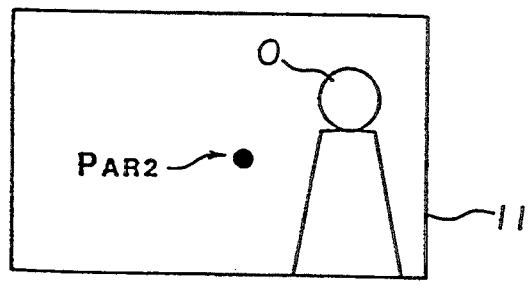
FIG. 7 is a view showing a still further display example of a picture displayed on the display screen of the view-finder of the video camera.

As stated above, in the video camera of this embodiment, since the position of the distance measurement of the focusing control unit 9 moved so as to track motion of an object is displayed as a frame-shaped display pattern corresponding to the distance measurement region on the display screen of the view-finder 11, it is possible to confirm the state of the automatic focusing control by the automatic tracking of an object by monitoring the display screen of the view-finder 11. Namely, a photographer can recognize which object is subjected to tracking in an automatic focusing control presently carried out. In the event that an erroneous operation takes place, since display patterns $P_{AR1}$, $P_{AR2}$ of the distance measurement region of the focusing control unit 9 and an image of the object O to be picked up are displayed on display screen of the view-finder 11 in such a manner that they are positionally shifted as shown in FIGS. 6 and 7, the photographer can rapidly carry out an operation to conduct a revertive automatic focusing control so that the lens is placed in an optimum focused state with respect to the object image.

As is clear from the foregoing description, the image pick-up means generates a video signal in response to an incident light representing an image of the object. The lens means (optical system means) guides the incident light to the image pick-up means. The first control means generates a focus control signal in accordance with a video signal supplied from a focusing region of the image pick-up means. In response to the focus control signal, the focusing means controls the lens means so as to focus the lens means on the image. Further, in response to a motion vector signal from the motion detecting means, the second control means controls a position of the focusing region so that the focusing region tracks motion of the image. Accordingly, it is possible to carry out such an automatic focusing control to track motion of an object to be image-picked up so that the lens is in always an optimum focused state with respect to an image of the object to be picked up. Further, the display means displays video signals supplied from the image pick-up means and a cursor representing the focusing region of the image pick-up means (corresponding to the distance measurement region of the focusing control unit 9 in the above-mentioned embodiment). Accordingly, by monitoring the display screen of the display means such as a view-finder, a photographer can confirm the state of an automatic focusing by the automatic tracking of the object, thus making it possible to recognize which object is subjected to tracking in an automatic focusing signal presently conducted. In the event that an erroneous operation takes place in the automatic focusing control, since the position of the focusing region (distance measurement region) and an image of the object to be picked up are displayed on the display means in such a manner that they are positionally shifted, a photographer can immediately conduct an operation to carry out a revertive automatic focusing control so as to be brought into an optimum focused state with respect to the object.

Accordingly, the video camera according to this invention can provide a video camera having an automatic focusing function of the object tracking system, which is capable of simply and securely picking up an image in an optimum focused state.

What is claimed is:

1. A video camera with automatic focus control comprising:
    a CCD image sensor for generating an electrical signal representative of an incident light pattern;
    an imaging lens including a focusing mechanism for focusing the incident light pattern representative of an image onto the CCD;
    a signal processing circuit for receiving the electrical signal and generating at least a color video signal and an analog luminance signal in response thereto;
    an analog to digital converter for receiving the analog luminance signal and converting the analog luminance signal to a digital luminance signal;
    a focus controller for receiving the digital luminance signal and for generating a focus control signal in response to a portion of the digital luminance signal in a distance measurement region of the CCD;
    a motion detector for receiving the digital luminance signal and generating a motion vector signal representative of motion of the image;
    a distance measurement region controller for generating an output signal indicative of the desired position of the distance measurement region in response to the motion vector signal so that the distance measurement region tracks motion of the image, said output signal being supplied to the focus controller to establish the distance measurement region;
    a drive circuit for receiving the focus control signal and for generating a drive signal in response thereto;
    a motor for driving the focusing mechanism so as to focus the incident light pattern representative of the image onto the CCD in response to the drive signal;
    a display control for generating a display output signal indicative of a desired position of the distance measurement region in response to the motion vector signal so that the distance measurement region tracks motion of the image; and
    a viewfinder for displaying at least the image and the distance measurement region in response to the color video signal and the display output signal, respectively.

* * * * *